3,485,637
PROCESS FOR AGGLOMERATING COFFEE
Irwin L. Adler, River Vale, N.J., and Howard J. Bowden, New City, N.Y., assignors to General Foods Corporation, White Plains, N.Y., a corporation of Delaware
No Drawing. Filed Sept. 8, 1966, Ser. No. 577,817
Int. Cl. A23 1/08; B01d 1/00
U.S. Cl. 99—71
8 Claims

ABSTRACT OF THE DISCLOSURE

It has been discovered that the uniformity, strength and appearance of fused coffee agglomerates can be improved by preconditioning the coffee powder prior to agglomeration. In the pretreatment, the coffee powder is chilled to below 60° F. and the moisture content of the powder is increased by wetting the surface of the powder prior to agglomerating the powder.

---

This invention involves an improvement of the fusion-agglomeration process for coffee described in co-pending application Ser. No. 528,770, filed Feb. 21, 1966, in the names of Billy Kan and Saul N. Katz and, more particularly, relates to preconditioning the coffee for that process.

In the Kan et al. patent application, a process is described for forming a strong coffee agglomerate by raising the temperature of the wet coffee agglomerates above the fusion point of the coffee thereby, in effect, forming melted or fused agglomerates as distinguished from merely a solution of dry dissolved coffee solids. However, in order to produce fused coffee agglomerates for commerce, it has been found that conventional agglomerating apparatus and techniques do not assure an efficient and reliable system due to certain variables in the initial dry soluble coffee powder. As a result, weak coffee agglomerates are sometimes formed (when fusion of the coffee does not occur), dense agglomerates (when excessive fusion occurs) and, in general, uniformity of product appearance is difficult to control. It has, therefore, now been found necessary to pretreat the dried coffee powder prior to agglomeration of the coffee regardless of the technique used for fusion-agglomeration.

It is a principal object of this invention to produce fused coffee agglomerates of uniform product appearance in an efficient and reproducible manner.

Another object of this invention is to improve the strength of coffee agglomerates.

Still another object of this invention is to change the particle appearance of instant coffee and provide a more granular-appearing soluble coffee.

Still another object of this invention is to avoid flavor degradation of the soluble coffee during agglomeration.

These and other objects and advantages of the present invention will be apparent from the description of the invention which follows.

This invention is founded on the discovery that the production of strong coffee agglomerates will be made more feasible by chilling the soluble coffee powder to below 60° F. prior to the agglomeration step, said agglomeration step comprising wetting the surfaces of the chilled coffee powder with a hot moistening fluid which condenses on said surfaces, contacting said surfaces to form wet coffee agglomerates, heating said wet agglomerates while sufficient moisture is present to an elevated temperature which fuses said agglomerates without degrading the essential coffee flavor of the coffee, and then chilling the agglomerates to below 80° F. to avoid caking of formed agglomerates.

Fusion, as used in this invention, means the melting, welding, cementing, or coalescing of the surfaces of the various coffee particles at the points of contact of these particles by raising the temperature of the coffee to above its thermoplastic point while sufficient moisture is present during said fusion in order to lower the thermoplastic point of the coffee to the point where the coffee is not degraded due to the application of heat. At moisture levels of above 10% fusion of coffee can occur at temperatures as low as 130° F. while at moisture levels of 3% the fusion point will not be reached until temperatures of 270° F. are reached.

Moisture addition during the fusion agglomeration is usually in the range of between 0.5 to 3% moisture, thus giving a total moisture content of between 3% and 6% depending on the initial moisture content of the coffee. However, the actual surface moisture at the bonding point is somewhere above 4%, say 5 to 15%.

By chilling the soluble powder to below 60° F. and, preferably, to between 20° and 40° F., it has been found that the agglomeration step which is conducted in the presence of hot, humid air, hot water spray, or steam promotes maximum condensation of water on the surfaces of the cold coffee particles thereby giving maximum wetting action to the powder surfaces and enabling the coffee to be raised to above its fusion point at these surface portions at more moderate temperature than would be necessary if the coffee were not uniformly wet in this manner.

In order to assure an efficient commercial operation in which reproducible and uniform results of agglomeration can be achieved, it has been found preferable to adjust the moisture content of the initial coffee powder to between 3 to 4%, preferably between 3.0% and 3.5% and to reduce the particle size of the coffee powder to a fine grind wherein essentially all the particles are less than 100 microns and preferably of a size between 5 and 50 microns.

When using steam as the moistening and agglomerating fluid, it is contemplated that the 3 variables of powder moisture, power size and powder temperature can be varied and controlled to provide the desired density, strength and color of the ultimate coffee agglomerate. In regard to initial powder moisture prior to agglomeration, moistures higher than 4% tend to produce a strong, very dense coffee agglomerate of a dark color whereas moisture contents of less than 3% tend to produce a less dense agglomerate of lighter color which is weak. In regard to the particle size of the dried powder, it has been found that particle sizes of above 100 microns tend to produce weak coffee agglomerates whereas fine grinding of the powder to below 100 microns tends to produce denser coffee agglomerates of greater strength. Finally, in regard to the temperature of the dried powder prior to being contacted with the moistening fluid, it has been found that product temperaures in the area of room temperature or above tend to produce agglomerates which are weak, lighter in color and less dense whereas chilling of the extract to below 60° F. tends to produce a better wetting action which in turn gives darker agglomerates. This last variable is believed essential to obtaining good strong coffee agglomerates and by altering the size and moisture content of the powder while keeping the chilling step constant, strong coffee agglomerates of different properties can be obtained.

The powder, once preconditioned according to this invention, is then agglomerated in a manner which accomplishes at least some fusion of the coffee particles. This can be done by various techniques including contact with jets of steam which wet the coffee powder, causes agglomerates to be formed in a turbulent zone of contact and then the wet agglomerates are dried at an elevated temperature of above 200° F. which causes fusion of the coffee at the contact points. However, any fusion technique can be used whereby the chilled coffee powder is first contacted with a hot moistening fluid which condenses on the powder and thoroughly wets the surface of the coffee powder, causes the wet coffee powder to adhere into agglomerates, heats the wet agglomerates (at a moisture content of above 4% and, preferably, 8–10%), to a temperature of 200° to 250° F. in order to accomplish fusion, and is then dried to a stable moisture content of about 3% or less.

The dry agglomerated coffee, before it is stored in a bulk container or subjected to the stresses of a packing operation, is cooled to a product temperature of below 80° F., preferably below 50° F., in order to set the agglomerate structure and prevent sticking of adjacent agglomerates, thereby forming a solidified cake or block of agglomerated coffee. It appears that this chilling step removes any surface tackiness left in the agglomerates by the drying step and allows the coffee to be further processed in the normal manner without experiencing sticking of the agglomerates to each other (caking).

While it is contemplated that this process has primary application to conventional soluble coffee powder which has a normal particle size of 100 to 300 microns and, therefore, that such powder must be ground to a finer particle size while being chilled to below 60° F. and a moisture content adjustment of between 3% and 3.5%, it can be seen that the preconditioning step is capable of modification whereby the small particles of coffee can be obtained directly from the spray-dryer are less than 200 of higher pressures (100 to 5000 p.s.i.g. pump pressure), smaller droplets (special atomizing nozzles), and lower spray-drying temperatures (200° to 450° F. air temperatures). However, even in the case where the particles obtained directly from the spray-drying are less than 200 microns and, preferably, less than 100 microns, it is understood that these particles, since they are in the form of spheres, should still be subjected to some kind of abrasive action which increases the surface area of said spheres in order to provide maximum irregular contact points for the agglomeration operation.

In essence, the objects of this invention will be achieved by obtaining a soluble coffee powder and then processing said powder in an abrasion or attrition mill (hammer mill) or similar device wherein the power will be ground to a size of less than 100 microns while said powder is subjected to refrigerant temperatures which lower its product temperature to below 60° F. and, preferably, to between 20° and 40° F. Typically, this can be done by injecting liquid carbon dioxide into the impact area of the mill and the coffee powder, the liquid $CO_2$ vaporizing to the atmosphere during the grinding operation while cooling the powder. Alternately, the mill can have its mechanical parts refrigerated by brine or liquid nitrogen or the powder can be separately chilled in a freezing room prior to the grinding operation. Of course, the powder can be ground separately without chilling and the chilling step performed afterward as long as the product temperature of the coffee, when it contacts the steam, is below 60° F., thus promoting good wetting of the ground coffee surfaces.

This invention will now be described by reference to several specific examples. In these examples, the agglomeration technique was similar to the one described in the Sienkiewicz et al. patent (2,977,203) wherein a jet of steam disposed in the same plane of the sheet or curtain of falling powder redirects and agglomerates said powder by impinging against said curtain at an angle normal to the direction of travel of the powder. A second steam jet was used to obtain further wetting of the agglomerates prior to fusion.

EXAMPLE 1

Soluble coffee powder (obtained by spray-drying 27% solids percolated coffee extract in the conventional manner) having a particle size distribution of between 100 and 200 microns, a moisture content of 2.7% and a density of 0.20 gm./cc. was ground in a hammer mill (Fitzpatrick Model D/6), equipped with a 4 mesh U.S. Standard Sieve screen. During grinding, the powder was chilled to a temperature of 15° F. by admission of liquid $CO_2$ to the grinding chamber, the liquid $CO_2$ cooling the chamber and powder as it gasified. Grinding produced a particle size distribution wherein 95% by weight of the particles were between 2 and 50 microns and with 50% of the particles being under 20 microns. The ground powder now had a much lighter color than the starting material.

The ground powder, which now had a moisture content of 3% and a density of 0.50 gm./cc. was then agglomerated according to the technique described in U.S. Patent 2,977,203 to Sienkiewicz, et al. wherein a curtain of powder (moving in one plane) is agglomerated by a jet of steam located in the same plane but wherein the steam jet impinges against said curtain at a substantial angle (45° to 135°) with respect to the direction of travel of the powder in the curtain.

However, in this particular embodiment, in addition to the single steam jet shown in the patent, a second steam jet was disposed in the same plane directly under the first steam jet. Also, a plurality of powder streams were used, and these fed a corresponding number of jets, all the jets being arranged in pairs in the respective plane of the powder stream to be agglomerated. In this arrangement, the first jet of steam to contact the powder was disposed at an angle of about 90° with respect to the direction of travel of the powder stream (as described in the Sienkiewicz et al. patent), whereas the second jet of steam was at an angle of between 95° and 135° with respect to the direction of the powder stream and impinged against the powder stream in an upward direction.

The chilled powder was fed from a chute into a vibrating distributor box having dimensions 12" x 5" and a height of about 4", the box being equipped with 13 thin narrow slots at the bottom about ⅛" wide and 2" long, spaced about ½" from one another in parallel fashion.

The powder, now having a slightly higher temperature (18° F.) and about 0.3 added moisture due to condensation (thus giving a total moisture of 3.0%), dropped by gravity through the slits (due to the vibratory action of the box) in the form of 13 parallel sheets traveling in a vertical direction or plane until redirected by the respective pairs of steam jets disposed in the same plane but at a substantial angle to the direction of the powder stream. The first series of steam jets had a nozzle pressure of 15 p.s.i.g. while the second series of steam jets had a nozzle pressure of about 8 p.s.i.g. The falling powder (positioned just outside an opening in the side of the drying chamber) was projected by the force of the steam (in the plane of the curtain) and was displaced from the curtain a distance of about 7 feet into the top portion of the drying chamber. The particles were wet, redirected and agglomerated upon contact with the first steam jet and the agglomerates were further wet with additional water and further redirected by the second steam jet. Moisture pick-up during agglomeration was estimated to be 2–3%, giving a total moisture of about 5–6%.

The wet agglomerated product was dried as it fell through the drying chamber (having a drying area of 20 feet high and 10 feet wide) by drying air introduced into the top of the chamber in co-current fashion at 2500 cubic ft. per minute, an inlet air temperature of 450° F. and an outlet air temperature of 250° F.

The dry agglomerated product now having a product temperature of about 150° F. was removed from the bottom of the chamber by a conveyor belt. The warm agglomerates were chilled by a cold air (50° F.) to below 80° F. to prevent caking and sticking of the agglomerates on storage. The agglomerates were passed through a screen to achieve a particle size distribution of between 5 and 40 mesh U.S. Standard Sieve with about 50% of the particles being greater than 20 mesh. The +5 mesh fraction was reground and added to the above while the fines fraction was recycled into the agglomerator feed. Bulk density of the product was 0.18 gm./cc., moisture content 4% and the color of the material was about the same as the starting material.

EXAMPLE 2

The process of Example 1 was followed with the exception that powder was cooled to 50° F. during grinding and the chilled powder was fed at a temperature of about 55° F. to the steam jets.

The end product was similar to that of Example 1 in regard to particle size and appearance with the exception of a slight decrease in moisture and density, the final product having 3.5 moisture and 0.17 gm./cc. density. However, this product was lighter in color than the Example 1 product.

EXAMPLE 3

The process of Example 1 was repeated with the exception that the initial material contained 1% additional moisture (3.7%). Powder was fed to the steam jets at a moisture of about 4%.

This agglomerated product, while having the same particle size distribution, had a much darker color than the Example 1 product (similar to the dark color of an Expresso or French Roast), while the density and moisture content was about the same (0.17 gm./cc. and 3.6% moisture).

EXAMPLE 4

The process of Example 1 was repeated but in lieu of excessive grinding the percolated extract was directly spray-dried into smaller particles of soluble coffee. This was done by using high atomization pressures (3000 p.s.i.g.) and lower drying temperatures (350 to 400° F. inlet and 200° to 250° F. outlet). This powder (having a particle size of less than 50 microns) was then passed through an abrasion mill to roughen the spherical surfaces of the spray-dried powder and increase the surface area of the powder.

The agglomerated product had a lighter color than the Example 1 product, a bulk density of about 0.12 gm./cc., and a moisture content of 3.5%. Particle size distribution was about the same as the Example 1 product.

While this invention has been described by reference to specific examples, it is understood to be limited only by the scope of the appended claims.

What is claimed is:

1. A process for preconditioning coffee powder for fusion-agglomeration which comprises chilling the coffee powder to below 60° F., wetting the surfaces of said chilled powder particles by contacting said particles with a moistening fluid, thereby increasing the moisture content of said particles, agglomerating said wet particles, raising the temperature of said agglomerate to above the fusion point of the coffee while sufficient moisture is present to avoid degrading the coffee flavor of said coffee, and then cooling said agglomerates to below 80° F. to avoid caking of the agglomerates.

2. The process of claim 1 wherein the moistening fluid is steam and the powder contacted by the steam has a moisture content of between 3% and 4% and a particle size of less than 100 microns.

3. The process of claim 2 wherein the coffee is chilled to below 60° F. by contact with liquid $CO_2$ during subdivision of the coffee powder.

4. The process of claim 3 wherein the coffee is chilled to between 20° and 40° F.

5. The process of claim 3 wherein the coffee is ground to a particle size of less than 50 microns.

6. The process of claim 3 wherein the coffee is fusion-agglomerated at a total moisture content of between 3% and 6%, a surface moisture content of between 5% and 15%, and a fusion temperature of between 150° and 250° F.

7. The process of claim 3 wherein coffee extract is atomized to droplets of less than 100 microns and dried at air temperatures of 250° to 450° F. prior to grinding.

8. The process of claim 7 wherein the coffee extract is atomized to less than 50 microns, dried, and then ground to chagne the surface configuration of the dried coffee powder from a spherical configuration to a jagged configuration.

References Cited

UNITED STATES PATENTS 2,897,084   7/1959   Peebles _____ 99—71
3,143,428   8/1964   Reimers et al. _____ 99—71 X MAURICE G. GREENSTEIN, Primary Examiner U.S. Cl. X.R.

99—199